United States Patent [19]

Loaiza

[11] Patent Number: 5,794,241
[45] Date of Patent: Aug. 11, 1998

[54] METHOD AND APPARATUS FOR DYNAMICALLY DISABLING AND ENABLING TABLE LOCKING FOR A DATABASE

[75] Inventor: Juan R. Loaiza, San Carlos, Calif.

[73] Assignee: Oracle Corporation, Redwood Shores, Calif.

[21] Appl. No.: 629,106

[22] Filed: Apr. 8, 1996

[51] Int. Cl.$^6$ .................................................. G06F 7/00
[52] U.S. Cl. ................................................................ 707/8
[58] Field of Search ................................. 395/608, 672, 395/674, 677, 511; 707/8

[56] References Cited

U.S. PATENT DOCUMENTS

| | | | |
|---|---|---|---|
| 4,399,504 | 8/1983 | Obermarck et al. | 364/200 |
| 4,574,350 | 3/1986 | Starr | 364/200 |
| 4,604,694 | 8/1986 | Hough | 364/200 |
| 4,821,175 | 4/1989 | Hikita et al. | 364/200 |
| 5,202,990 | 4/1993 | Saikawa | 395/650 |
| 5,261,069 | 11/1993 | Wilkinson et al. | 395/425 |
| 5,287,521 | 2/1994 | Nitta et al. | 395/725 |
| 5,459,862 | 10/1995 | Garliepp et al. | 395/600 |
| 5,502,840 | 3/1996 | Barton | 395/727 |
| 5,526,524 | 6/1996 | Madduri | 395/726 |

FOREIGN PATENT DOCUMENTS

| | | |
|---|---|---|
| 0 723 238 | 7/1996 | European Pat. Off. . |
| 0 724 223 | 7/1996 | European Pat. Off. . |

OTHER PUBLICATIONS

Lock Management Architecture Overview, IBM Technical Disclosure Bulletin, vol. 31, No. 5, pp. 125–128, Oct. 1988.
Conditional Locking of Nonroot Index Pages, IBM Technical Disclosure Bulletin, vol. 32, No. 3, pp. 57–58, Aug. 1989.

Primary Examiner—Thomas G. Black
Assistant Examiner—Michael J. Wallace, Jr.
Attorney, Agent, or Firm—Blakely, Sokoloff, Taylor & Zafman LLP

[57] ABSTRACT

Method for dynamically enabling and disabling table locking for a table in a database in a relational database management system. A table locking state is associated with the table and can be set to either enabled or disabled to indicate the current state of table locking for the table. To disable table locking, a user must first acquire an exclusive table lock. To re-enable table locking, a user must wait for any user currently accessing the table to perform e.g., a query, to finish accessing the table before table locking is enabled.

18 Claims, 3 Drawing Sheets

METHOD AND APPARATUS FOR DYNAMICALLY DISABLING AND ENABLING TABLE LOCKING FOR A DATABASE

FIELD OF THE INVENTION

The present invention relates to a method and apparatus for dynamically disabling and enabling table locking for a database in a database management system (DBMS).

BACKGROUND OF THE INVENTION
Introduction

Database management system software is useful for solving the problems of information management. In general, a database management system (DBMS) must be able to reliably manage a large amount of data in a multi-user environment so that many users can concurrently access the same data. This must be accomplished while delivering acceptable performance to the users of the database. A relational database management system (RDBMS), such as the Oracle Server database management system available from Oracle Corporation, Redwood City, Calif. 94065, the assignee of the present invention, provides efficient and effective solutions for major database features, including, but not limited to, large database and space management control, and many concurrent database users. The Oracle Server DBMS supports large databases, e.g., hundreds of gigabytes in size. Moreover, the Oracle Server DBMS supports large numbers of concurrent users executing a variety of database applications operating on the same data. It minimizes data contention and guarantees data concurrency.

Present database management systems, such as the Oracle Server DBMS, generally adhere to an industry accepted standard for a data access language, e.g., the Structured Query Language (SQL). SQL is a standard database access language for relational database management systems. All operations on the information in a database management system using SQL are performed using SQL statements, which can be thought of as straight-forward computer programs or instructions. SQL statements can be divided into a number of general categories, including data definition statements (DDL), data manipulation statements (DML), and transaction control statements. DML statements manipulate a database's data. For example, querying, inserting, updating, and deleting rows of a table are all DML operations. Locking a table and examining the execution of an SQL statement are also DML operations.

Transaction control statements manage the changes made by DML statements. They allow the user to group changes into logical transactions. Examples include the commit, rollback, and savepoint transaction control statements provided by SQL in the Oracle Server DBMS. A transaction is simply a logical unit of work that comprises one or more SQL statements executed by a single user. A transaction generally begins with a user's first executable SQL statement and ends when it is explicitly committed or rolled back by the user.

A primary concern of a multi-user database management system is how to control concurrency, or the simultaneous access of the same data by many users. Without adequate concurrency controls, data could be updated or changed improperly, compromising data integrity. If many users are accessing the same data, one way of managing data concurrency is to make each user wait their turn. The goal of a database management system is to reduce that wait so it is non-existent or negligible to each user. All DML statements should proceed with as little interference as possible and destructive interactions between concurrent transactions should be prevented, without sacrificing performance or data integrity.

A database management system, such as the Oracle Server DBMS, can resolve such issues by using various types of locks. A database management system uses locks to control current access to data. Locks are mechanisms intended to prevent destructive interaction between users accessing data. Destructive interaction can be interpreted as any interaction that incorrectly updates data or incorrectly alters underlying data structures.

Locks are used to achieve two important database goals: consistency, which insures that the data the user is viewing or changing is not changed by other users until the user is finished with the data, and integrity, which insures that the database's data and data structures reflect all changes made to them in the correct sequence. Locks guarantee data integrity while allowing maximum concurrent access to the data by unlimited users.

In general, there are two types of locks: exclusive locks and shared locks. At any given time, only one exclusive lock can be held on a resource, such as a table, or a row in a table. However, many shared locks can be concurrently held on a single resource. Both exclusive locks and shared locks allow transactions to access the locked resource, but only exclusive locks typically allow a transaction to perform some types of operations on the resource, such as updates and deletes.

Data Concurrency and Consistency

In a single-user database, the user can modify data with any transaction without concern for other users modifying the same data at the same time. However, in an multi-user database, the statements within simultaneous multiple transactions can update the same data. Concurrently executing transactions must be guaranteed to produce the same effect as serially executing the same transactions. Therefore, a primary concern of a multi-user database includes how to control data concurrency and consistency. Data concurrency requires that access to data concurrently used by many users must be coordinated. Data consistency requires that a user always sees a consistent view of all data, which consists of all data committed by other transactions as of that time and all changes made by the user up to that time. Specific concurrency and consistency problems that a multi-user database must prevent include inconsistent reads, dirty reads, lost updates, and destructive DDL operations.

Data Locking

In general, multi-user databases use some form of data locking to solve the problems associated with data concurrency, integrity, and consistency. Locks are mechanisms used to prevent destructive interactions between users accessing the same resource, such as an entire table. For example, the Oracle Server DBMS utilizes a data lock to guarantee that a specific row in a table can be updated by only one transaction at any given time and that a table cannot be dropped if an uncommitted transaction contains an insert into the table.

DML operations can acquire data locks at two different levels: for specific rows and for entire tables. With respect to entire tables, a transaction acquires a table lock when a table is modified by such DML statements as insert, update, delete, lock table, etc. These DML operations require table locks to reserve some level of DML access to the table on behalf of a transaction and to prevent conflicting DDL operations that would override data modifications in an on-going transaction. Any non-NULL table lock acquired for a table prevents the acquisition of an exclusive DDL lock on the same table by another transaction, thereby precluding other transactions from performing DDL operations that require an exclusive DDL lock on the table. For example, a table must not be altered or deleted while an uncommitted transaction holds a table lock for the table.

As was briefly mentioned above, a table lock can be held in one of several modes: share mode and exclusive mode. A shared table lock held by a transaction allows other transactions only to query or lock specific rows in a table. No updates are allowed by other transactions. Multiple transactions can concurrently hold shared table locks for the same table. In this case, no transaction can update the table even if the transaction holds row locks. Therefore a transaction that has a shared table lock can only update the table if no other transactions also have a shared table lock for the same table. With respect to an exclusive table lock, it provides the most restrictive mode of a table lock, allowing a transaction that holds the lock exclusive write access to the table. Only one transaction can obtain an exclusive table lock for a table. An exclusive table lock held by a transaction prohibits other transactions from performing any type of DML statement on the same table. Other transactions cannot insert, update, delete rows in the same table, lock rows in the same table, or lock the table.

As can be seen from the above discussion, data locking is imperative to maintaining data consistency and concurrency. In an environment in which the database is maintained on a single server, the overhead incurred by implementing a data locking mechanism is generally outweighed by the benefits of such a locking mechanism. However, in a parallel database server environment, in which a database may be distributed among two or more database servers, the overhead required to maintain the data locking mechanisms described above can significantly decrease the overall performance of the database management system. What is needed is a way to dynamically disable and re-enable data locking in a database management system so that a database administrator or user can improve the database management system performance in a distributed database server environment as desired.

SUMMARY OF THE INVENTION

A method and system for dynamically disabling and enabling table locking for a table in a database of a database management system is provided. According to one aspect of the invention, a user can disable table locking by obtaining an exclusive table lock for a given table, setting a table locking state for the table to a value indicating table locking is disabled, and then releasing the exclusive table lock for the table. Thereafter, a user accessing the table may access data within the table without obtaining a share table lock. Moreover, a new user accessing the table after table locking has been disabled cannot obtain an exclusive table lock on the table.

According to another aspect of the invention, a user may, once table locking has been disabled, re-enable table locking for the table by requesting the table locking state for the table be set to a value indicating table locking is enabled. However, the user must wait until pre-existing users currently accessing the table finish accessing the table before the transition to the table locking state of enabled is completed. A user accessing the table while a request for the table locking state to be set to enable is pending, but before the table locking state of enable is actually obtained, must obtain a share table lock to perform an operation on the table that would otherwise require share table lock if table locking was enabled. Additionally, a user accessing the table after a request for the table locking state to be set to enable is pending must obtain an exclusive table lock to perform an operation on the table that would otherwise require an exclusive table lock if table locking was, in fact, enabled.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for dynamically disabling and enabling table locking in a database management system is described. In the following description, for purposes of explanation, numerous specific details are set forth in order to provide a thorough understanding of the present invention. It will be apparent, however, to one skilled in the art that the present invention may be practiced without these specific details. In other instances, well know structures and devices are shown in block diagram form in order to avoid unnecessarily obscuring the present invention.

Hardware Overview

Figure 1:
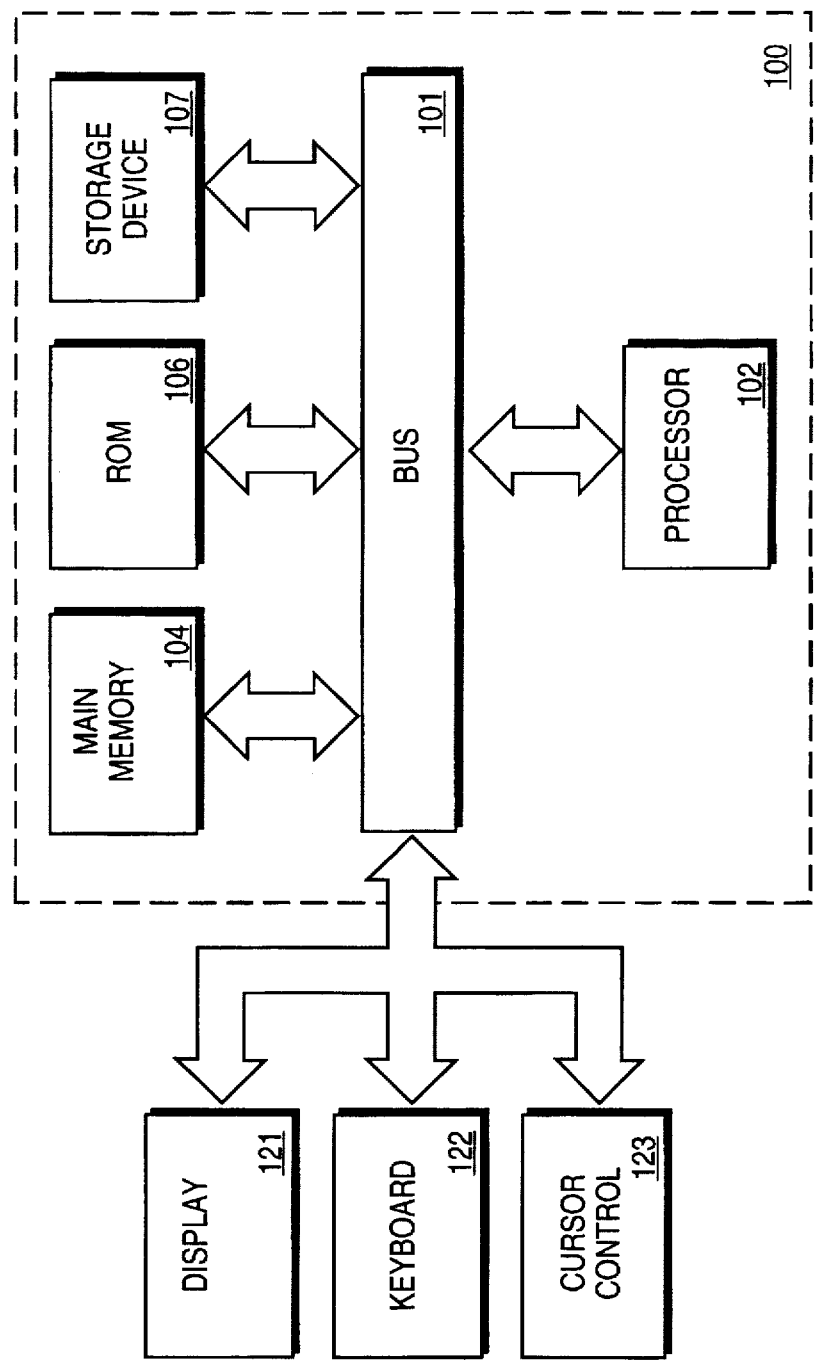
FIG. 1 illustrates a computer system on which the present invention may be implemented.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

In the currently preferred embodiment of the invention, computer system 100 is configured to execute a database application. Computer system 100 may be one of many computer systems accessing data stored in the same database, which may be centralized or distributed. Each of the computer systems may be executing one or more transactions.

Dynamically Disabling Table Locking

In general, database management systems, such as the Oracle Server DBMS, provide some means for table locking to insure data consistency and concurrency, as described above. Generally, such locking mechanisms are enabled by default. However, there may be instances in which a database administrator or user may want to disable table locking. Thus, it would be advantageous to be able to disable table locking without the need to shut down or reset the database, thereby providing continued access to the database by the users. A dynamic method of disabling table locking would allow users to continue accessing the database without any downtime. An embodiment of the present invention associates a table locking state with a database table, which may be set to either table locking enabled or table locking disabled. By default, this table state will be set to table locking enabled.

Figure 2:
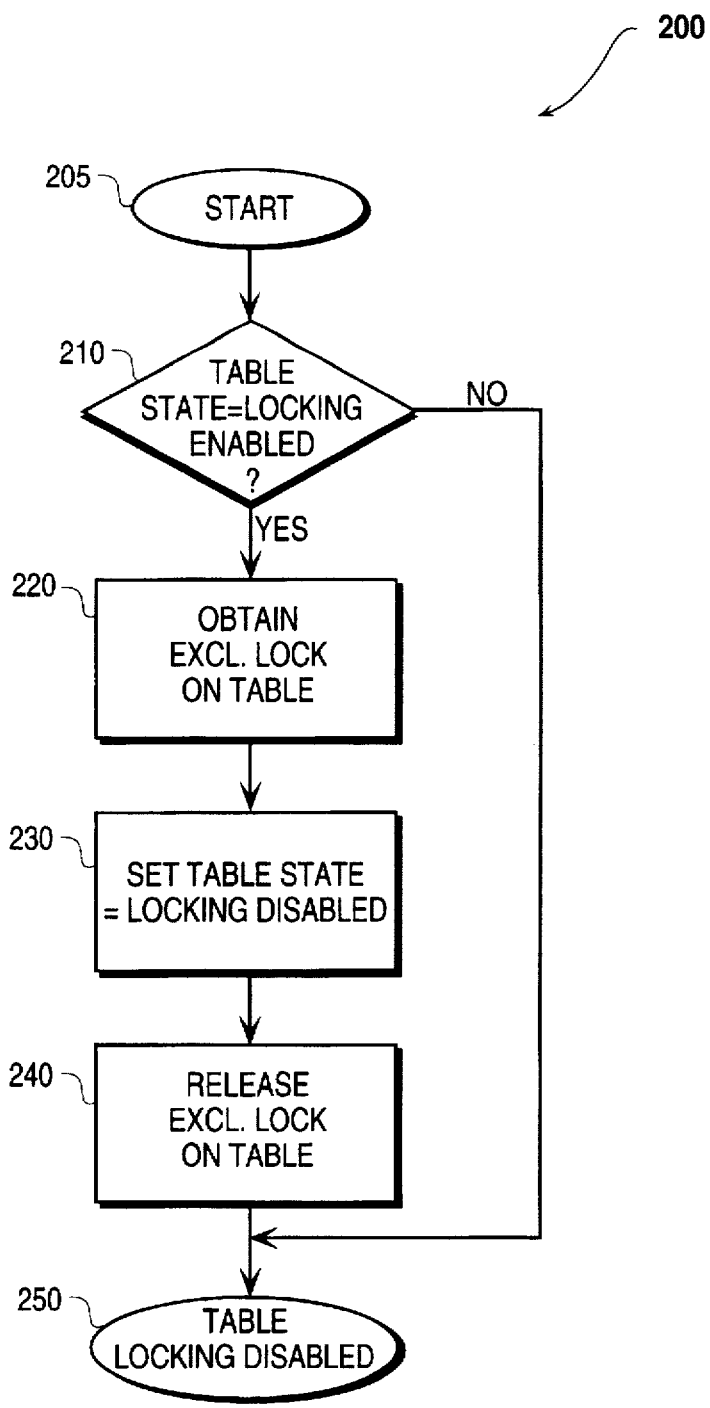
FIG. 2 is a flowchart of a method as may be embodied by the present invention to disable table locking.

With reference to flowchart 200 in FIG. 2, the steps set forth by an embodiment of the present invention to disable table locking are shown. A database administrator or user desiring to disable table locking first checks at step 210 to determine whether the table state is currently set to table locking enabled. If, indeed, the table locking state is set to table locking enabled, the user at step 220, obtains an exclusive lock on the table. Subsequently, at step 230, the user simply changes the table state to table locking disabled. At step 240, the user releases the exclusive lock obtained in step 220 on the table. From that point forward, table locking for this particular table is disabled, until such time as the database administrator or user dynamically enables table locking for the given table as described below.

Disable table locking may be used to avoid overhead and improve access time in a database management system. Moreover, in many database management system environments, operations that require exclusive table locking are relatively rare. Thus, in an environment such as a distributed database environment, where overhead is particularly of concern, the ability to disable table locking is a useful feature.

Dynamically Enabling Table Locking

Figure 3:
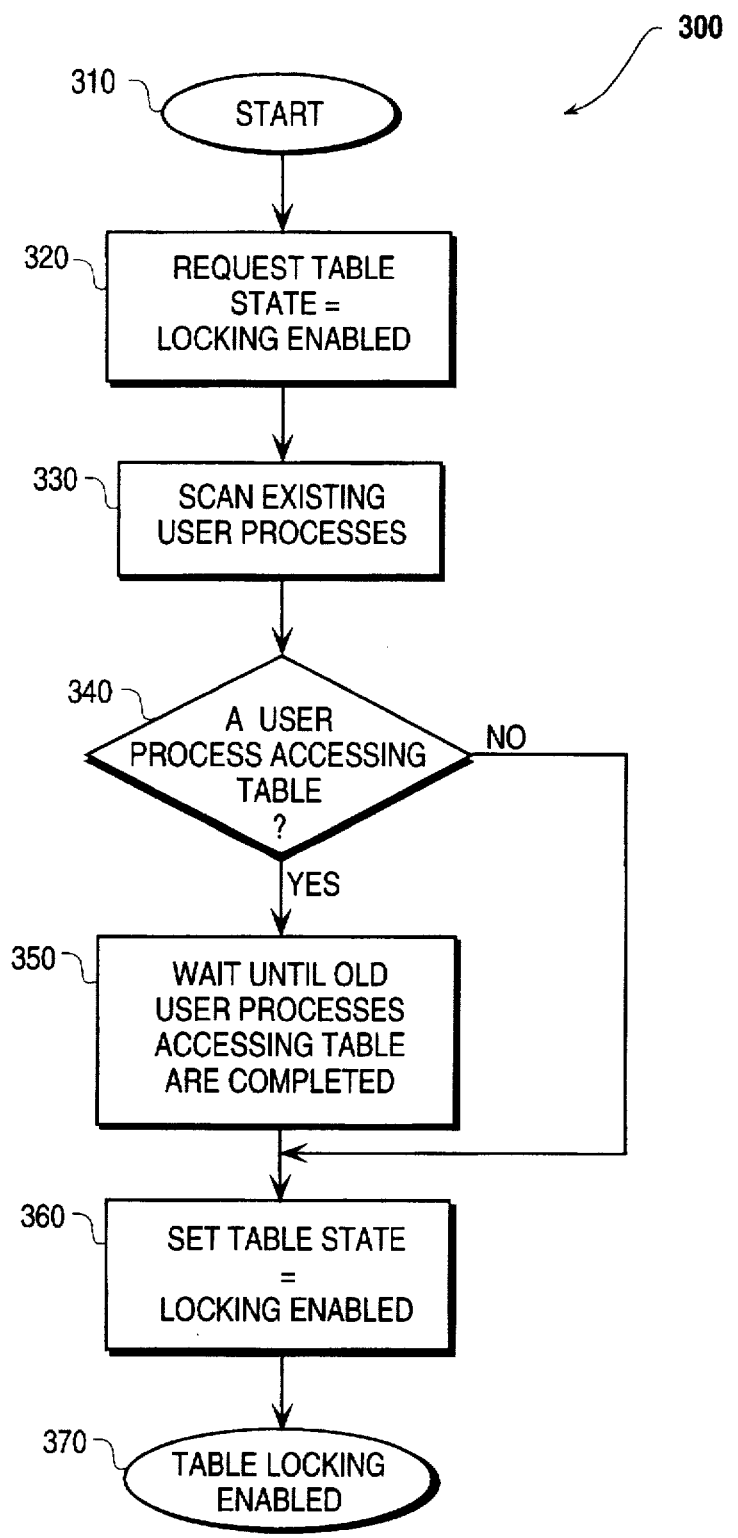
FIG. 3 is a flowchart of a method as may be embodied by the present invention to enable table locking.

By default, table locking is generally enabled. However, if a database administrator or user has previously disabled table locking dynamically as described above, database locking must be enabled again if locking is desired. With reference to flowchart 300 in FIG. 3, the steps required for dynamically enabling table locking are outlined. Beginning at step 320, a user first requests the table locking state to be set to table locking enabled. It should be noted however that in so doing, the table state is not yet changed to a table locking enabled state. Rather, the user must first wait until any existing users who are currently accessing the table (without locking because heretofore table locking was disabled) are finished accessing the table. Thus, at step 330, the user must scan the existing user processes to determine which of those users are currently accessing the table without locking. If one or more user processes are determined to be accessing the table at step 340, then, at step 350, the user must wait until the pre-existing user processes currently accessing the table are finished. According to one embodiment, the DBMS assumes that any existing user process could be accessing the table in question. Therefore, the DBMS ensures that no process is accessing the table without a table lock by waiting until all transactions that were in existence before the request to enable the table locking state for the table have been completed. According to an alternative embodiment, the DBMS may actually scan the status of, or communicate with, such transactions to determine whether they have accessed the table in question. In the event that no user processes are currently accessing the table at the time that the request for the table locking state be set to locking enabled, or if the user waits until user processes currently accessing the table are completed, then, at step 360, table locking is actually enabled. This transition period is needed due to the fact that there may be any number of users accessing the table without locking at the time that the request for the table locking state to be changed to enabled is received by the database management system from the user. In this way, those users currently accessing the table at the time the request to enable table locking is received are insured continued access to the table until their transactions are completed and they are finished with the table before locking is enabled. Any new users attempting to access the table once the request to change the table state to locking enabled is received must obtain share locking in order to access the table to perform, for example, a query. Any user attempting to access the table before table locking has actually been enabled at step 360 to perform an operation that would otherwise require an exclusive table lock receives an error and is prevented from so accessing the table until such time as table locking is enabled.

For the purposes of explanation, embodiments of the present invention has been described with respect to table locking. However, in alternative embodiments, the techniques described herein may be applied to numerous types of resources, such as instances of objects in an object-oriented database. Thus, the present invention is not limited to any particular type of resource or database management system environment.

In the foregoing specification, the invention has been described with reference to specific embodiments thereof. It will, however, be evident that various modifications and changes may be made thereto without departing from the broader spirit and scope of the invention. The specifications and drawings are, accordingly, to be regarded in an illustrative rather than a restrictive sense. The present invention is intended to be limited, therefore, only by the claims presented below.

What is claimed is:

1. A computer implemented method for disabling locking on a resource in a database comprising the steps of:

a) causing user processes to obtain a lock before accessing said resource;

b) obtaining an exclusive lock on said resource;

c) setting a locking state to disabled for said resource;

d) releasing said exclusive lock on said resource; and, e) after releasing said exclusive lock, allowing said user processes to access said resource without obtaining said lock.

2. The method of claim 1 further comprising the step of a user process querying said resource without obtaining a share lock on said resource after said step of setting a locking state to disabled for said resource.

3. The method of claim 1 further comprising the step of preventing a new user process accessing said resource from obtaining an exclusive lock on said resource after said step of setting a locking state to disabled for said resource.

4. The method of claim 1 wherein said resource is a table in a relational database; and said step of obtaining an exclusive lock on said resource includes obtaining an exclusive lock on said table.

5. The method of claim 1 wherein said resource is an object in an object-oriented database; and said step of obtaining an exclusive lock on said resource includes obtaining an exclusive lock on said object.

6. The method of claim 1 further comprising the step of a user process verifying said locking state is enabled for said resource before said step of causing user processes to obtain a lock before accessing said resource is performed; and each of said steps in claim 1 is performed by said user process.

7. The method of claim 1 further comprising the step of a new user process querying said resource without obtaining a share lock on said resource after said locking state is disabled for said resource.

8. The method of claim 1 further comprising the step of denying a request to obtain an exclusive lock on said resource made by a new user process accessing said resource after said locking state is disabled for said resource.

9. A computer implemented method for enabling locking on a resource in a database, comprising the steps of:

a) allowing user processes to access said resource without obtaining a lock;

b) requesting a locking state of enabled for said resource;

c) waiting for pre-existing user processes accessing said resource without having obtained said lock to finish accessing said resource;

d) obtaining said locking state of enabled for said resource; and, e) requiring user processes accessing said resource to obtain said lock.

10. The method of claim 9 further comprising said step of requiring a user process accessing said resource after said step of requesting a locking state of enabled for said resource to obtain a share lock on said resource to perform an operation that otherwise requires said share lock when said locking state is enabled for said resource.

11. The method of claim 9 further comprising said step of preventing a user process attempting to access said resource after said step of requesting a locking state of enabled for said resource from obtaining an exclusive lock on said resource to perform an operation that otherwise requires said exclusive lock until said locking state is enabled for said resource.

12. The method of claim 9 wherein said step of waiting for pre-existing user processes accessing said resource to finish accessing said resource includes the step of waiting until all user processes executing when said step of requesting a locking state of enabled for said resource is performed, have completed execution.

13. The method of claim 9 wherein said resource is a table in a relational database; and said step of obtaining said locking state of enabled for said resource includes the step of obtaining said locking state of enabled for said table.

14. The method of claim 9 wherein said resource is a object in an object-oriented database and said step of obtaining said locking state of enabled for said resource includes the step of obtaining said locking state of enabled for said object.

15. The method of claim 9 wherein the step of waiting for pre-existing user processes accessing said resource to finish accessing said resource further comprises the step of scanning for pre-existing user processes accessing said resource without a share lock on said resource to perform an operation that would otherwise require said share lock when said locking state is enabled for said resource.

16. A method for managing access to a resource in a database comprising the computer-implemented steps of:

a) if said resource is in a disabled locking mode and no request to enable locking mode on said resource is pending, then allowing user processes to access said resource without obtaining locks on said resource;

b) if said resource is in a disabled locking mode and a request to enable locking mode on said resource occurs, then requiring new user processes to obtain locks on said resource to access said resource;

c) if a request to enable locking mode on said resource is pending, then switching to enabled locking mode on said resource when existing user processes accessing said resource finish accessing said resource; and, d) if said resource is in enabled locking mode, then requiring said user processes to obtain locks to access said resource.

17. The method of claim 16 wherein said resource is a table in a relational database.

18. The method of claim 16 wherein said resource is an object in an object-oriented database.

* * * * *